United States Patent
Bhatia et al.

(10) Patent No.: US 10,831,565 B2
(45) Date of Patent: Nov. 10, 2020

(54) FAULT TOLERANT ADAPTER SYSTEM TO CONSUME DATABASE AS A SERVICE

(71) Applicant: SAP SE, Walldorf (DE)

(72) Inventors: Anubhav Bhatia, Palo Alto, CA (US); Apoorva Kumar, Dublin (IE)

(73) Assignee: SAP SE, Walldorf (DE)

( * ) Notice: Subject to any disclaimer, the term of this patent is extended or adjusted under 35 U.S.C. 154(b) by 176 days.

(21) Appl. No.: 15/881,090

(22) Filed: Jan. 26, 2018

(65) Prior Publication Data

US 2019/0095257 A1 Mar. 28, 2019

Related U.S. Application Data

(60) Provisional application No. 62/564,364, filed on Sep. 28, 2017.

(51) Int. Cl.
*G06F 11/00* (2006.01)
*G06F 9/54* (2006.01)
*G06F 11/07* (2006.01)
*G06F 16/25* (2019.01)
*G06F 21/60* (2013.01)

(52) U.S. Cl.
CPC .......... *G06F 9/541* (2013.01); *G06F 11/0706* (2013.01); *G06F 16/25* (2019.01); *G06F 16/258* (2019.01); *G06F 21/60* (2013.01)

(58) Field of Classification Search
CPC .. G06F 11/00; G06F 11/1008; G06F 11/1666; G06F 11/22; G11C 29/00; G11B 20/18
USPC .......................................................... 714/1
See application file for complete search history.

(56) References Cited

U.S. PATENT DOCUMENTS

| | | | | |
|---|---|---|---|---|
| 8,769,065 B1* | 7/2014 | Ninan | ................... | H04L 41/046 709/223 |
| 2003/0233366 A1* | 12/2003 | Kesselman | ......... | G06F 16/2358 |
| 2005/0033776 A1* | 2/2005 | Kircher | ................. | G06F 16/958 |
| 2006/0248467 A1* | 11/2006 | Elvanoglu | ............. | G06F 9/4493 715/744 |

(Continued)

OTHER PUBLICATIONS

EP Extended European Search Report in European Appln. No. 18195730, dated Jan. 2, 2019, 8 pages.

(Continued)

*Primary Examiner* — Sarai E Butler
(74) *Attorney, Agent, or Firm* — Fish & Richardson P.C.

(57) ABSTRACT

An adapter framework is provided for consuming resources provided by a database service by client applications. A location of an interface of the database service is received. Static metadata of a client application is received from the client application. Mapping of field names defined at the database service to field names defined in the client application is received at the framework. Metadata for a service interface is created at the adapter framework based on the received static metadata and dynamic metadata for dynamic fields from the database service. The mapping of field names is appended with mappings for the dynamic fields. At a runtime processor, a type of a data request from the client to the database service is determined. The request is processed and a response from the database service is generated by the adapter framework and provided to the client application in an expected format.

20 Claims, 12 Drawing Sheets

(56) References Cited

U.S. PATENT DOCUMENTS

| | | | | |
|---|---|---|---|---|
| 2008/0109592 | A1* | 5/2008 | Karamcheti | G06F 9/5016 711/103 |
| 2010/0287264 | A1* | 11/2010 | Lopes | G06F 9/44505 709/221 |
| 2011/0022880 | A1* | 1/2011 | Champion | G06F 16/957 714/2 |
| 2011/0302135 | A1* | 12/2011 | Prophete | G06F 16/27 707/634 |
| 2016/0034518 | A1* | 2/2016 | Sood | G06F 3/04842 707/690 |
| 2017/0154083 | A1* | 6/2017 | Sundaram P | G06Q 10/063 |
| 2017/0289134 | A1* | 10/2017 | Bradley | H04L 63/102 |
| 2018/0089296 | A1* | 3/2018 | Pham | H04L 67/1095 |
| 2018/0121492 | A1* | 5/2018 | Sawhney | G06F 16/2336 |
| 2018/0157982 | A1 | 6/2018 | Southall et al. | |
| 2018/0176326 | A1* | 6/2018 | Shantharam | H04L 67/303 |
| 2018/0278725 | A1* | 9/2018 | Thayer | H04L 69/08 |
| 2019/0065177 | A1* | 2/2019 | Khoongumjorn | G06F 9/4488 |

OTHER PUBLICATIONS

Adya et al., "Anatomy of the ADO.NET entity framework," Proceedings of the ACM SIGMOD International Conference on Management of Data, Beijing China, Jun. 12-14, 2007, pp. 877-888.

Carey et al., "Data Services," Communications of the ACM, Jun. 2012, 55(6): 86-97.

Jacobs [online], "Hystrix, Defend your App," Jul. 2017, retrieved from https://github.com/Netflix/hystrix/wiki, 8 pages.

"Hystrix"; copyright GitHub, Inc; 2018; retrieved online Jan. 25, 2018; 5 pages; (https://github.com/Netflix/Hystrix/wiki).

Wikipedia; "Circuit breaker design pattern"; retrieved online Jan. 25, 2018; 3 pages; (https://en.wikipedia.org/wiki/Circuit_breaker_design_pattern).

"Pattern: Circuit Breaker"; Copyright © 2017 Chris Richardson; retrieved online Jan. 25, 2018; 3 pages; (http://microservices.io/patterns/reliability/circuit-breaker.html).

"Overview (OData Version 2.0)"; Copyright 2015-2017 OData—The Protocol for REST APIs; retrieved online Jan. 25, 2018; 9 pages; (http://www.odata.org/documentation/odata-version-2-0/overview/).

"Terminology (OData Version 2.0)"; Copyright 2015-2017 OData—The Protocol for REST APIs; retrieved online Jan. 25, 2018; 3 pages; (http://www.odata.org/documentation/odata-version-2-0/terminology/).

"URI Conventions (OData Version 2.0)"; Copyright 2015-2017 OData—The Protocol for REST APIs; retrieved online Jan. 25, 2018; 16 pages; (http://www.odata.org/documentation/odata-version-2-0/uri-conventions/).

"Operations (OData Version 2.0)"; Copyright 2015-2017 OData—The Protocol for REST APIs; retrieved online Jan. 25, 2018; 21 pages; (http://www.odata.org/documentation/odata-version-2-0/operations/).

"Batch Processing (OData Version 2.0)"; Copyright 2015-2017 OData—The Protocol for REST APIs; retrieved online Jan. 25, 2018; 10 pages; (http://www.odata.org/documentation/odata-version-2-0/batch-processing/).

"Atom Format (OData Version 2.0)"; Copyright 2015-2017 OData—The Protocol for REST APIs; retrieved online Jan. 25, 2018; 13 pages; (http://www.odata.org/documentation/odata-version-2-0/atom-format/).

"JSON Format (OData Version 2.0)"; Copyright 2015-2017 OData—The Protocol for REST APIs; retrieved online Jan. 25, 2018; 10 pages; (http://www.odata.org/documentation/odata-version-2-0/json-format/).

"OData Version 4.0. Part 3: Common Schema Definition Language (CSDL) Plus Errata 03"; Copyright ©OASIS Open 2016; published online Jun. 2, 2016; 86 pages; (http://docs.oasis-open.org/odata/odata/v4.0/odata-v4.0-part3-csdl.pdf).

Communication Pursuant to Article 94 (3) EPC issued in European Application No. 18195730.9 on Apr. 23, 2020, 8 pages.

* cited by examiner

```xml
<EntityType Name="HierarchyElement">
  <Key>
    <PropertyRef Name="HierarchyId"></PropertyRef>
    <PropertyRef Name="RootThingId"></PropertyRef>
  </Key>
  <Property Name="HierarchyId" Type="Edm.String" Nullable="false"></Property>
  <Property Name="HierarchyDescription" Type="Edm.String"></Property>
  <Property Name="HierarchyName" Type="Edm.String"></Property>
  <Property Name="HierarchyExternalId" Type="Edm.String"></Property>
  <Property Name="RootThingId" Type="Edm.String" Nullable="false"></Property>
  <Property Name="RootThingName" Type="Edm.String" Nullable="false"></Property>
  <Property Name="RootThingType" Type="Edm.String"></Property>
  <Property Name="RootThingDescription" Type="Edm.String"></Property>
  <Property Name="RootThingExternald" Type="Edm.String"></Property>
</EntityType>

<EntityType Name="PST_com_sap_core__ExceededTemparature">
    <Key>
      <PropertyRef Name="EventId"/>
    </Key>
    <Property Name="EventId" Type="Edm.String" Nullable="false"/>
    <Property Name="ExternalId" Type="Edm.String"/>
    <Property Name="Path" Type="Edm.String"/>
    <Property Name="CorrelationId" Type="Edm.String"/>
    <Property Name="BusinessTimestamp" Type="Edm.String"/>
    <Property Name="EventType" Type="Edm.String"/>
    <Property Name="Status" Type="Edm.String"/>
    <Property Name="Severity" Type="Edm.String"/>
    <Property Name="Code" Type="Edm.String"/>
    <Property Name="ThingId" Type="Edm.String"/>
    <Property Name="ThingProperty" Type="Edm.String"/>
    <Property Name="ThingExternalId" Type="Edm.String"/>
    <Property Name="ThingISOCode" Type="Edm.String"/>
    <Property Name="ThingDescription" Type="Edm.String"/>
    <Property Name="ThingName" Type="Edm.String"/>
    <Property Name="ThingType" Type="Edm.String"/>
    <Property Name="BPName" Type="Edm.String"/>
    <Property Name="BPLandlinePhoneNumber" Type="Edm.String"/>
    <Property Name="BPMobilePhoneNumber" Type="Edm.String"/>
    <Property Name="ThingCustomerId" Type="Edm.String"/>
    <Property Name="ThingRegionDescription" Type="Edm.String"/>
    <Property Name="ThingCityName" Type="Edm.Int64"/>
    <Property Name="ThingCountryDescription" Type="Edm.Int64"/>
    <Property Name="ThingCountryId" Type="Edm.Int64"/>
    <Property Name="ThingAddressRepresentation" Type="Edm.Int64"/>
    <Property Name="ThingLocationId" Type="Edm.Int64"/>
    <Property Name="Temparature" Type="Edm.Int64"/>
    <NavigationProperty Name="HierarchyElements" Relationship="com.sap.appiot.PST_com_sap_core__ExceededTemparature_HierarchyElement_Association" FromRole="PST_com_sap_core__ExceededTemparatures" ToRole="HierarchyElements"/>
</EntityType>
```

FIG. 4

```xml
<EntityType Name="derivedSignalsType">
    <Key>
        <PropertyRef Name="Event"/>
        <!-- <PropertyRef Name="Timestamp"/> -->
    </Key>
    <Property Name="AssetName" Type="Edm.String" MaxLength="255"/>
    <Property Name="AssetThingId" Type="Edm.String" MaxLength="5000"/>
    <Property Name="AssetExternalId" Type="Edm.String" MaxLength="255"/>
    <Property Name="ComponentName" Type="Edm.String" MaxLength="255"/>
    <Property Name="ComponentThingId" Type="Edm.String" Nullable="false" MaxLength="255"/>
    <Property Name="ComponentExternalId" Type="Edm.String" MaxLength="255"/>
    <Property Name="TypeFlag" Type="Edm.String" Nullable="false" MaxLength="255"/>
    <Property Name="Thing" Type="Edm.String" Nullable="false" MaxLength="255"/>
    <Property Name="ThingExternalId" Type="Edm.String" MaxLength="255"/>
    <Property Name="Name" Type="Edm.String" MaxLength="255"/>
    <Property Name="Event" Type="Edm.String" MaxLength="255"/>
    <Property Name="Timestamp" Type="Edm.DateTime"/>
    <Property Name="ExternalId" Type="Edm.String" MaxLength="255"/>
    <Property Name="BusinessTimestamp" Type="Edm.DateTime"/>
    <Property Name="Status" Type="Edm.String" MaxLength="255"/>
    <Property Name="Type" Type="Edm.String" Nullable="true" MaxLength="255"/>
    <Property Name="Severity" Type="Edm.Int32"/>
    <Property Name="Code" Type="Edm.String" MaxLength="255"/>
    <Property Name="Source" Type="Edm.String" MaxLength="255"/>
    <Property Name="Property" Type="Edm.String" MaxLength="255"/>
</EntityType>
```

FIG. 5

Example of mapping

ComponentName=[ThingName]
ComponentThingId=[ThingId]
ComponentExternalId=[ThingExternalId]
TypeFlag=DerivedAtRT
Thing=ToBeRemoved
ThingExternalId=ToBeRemoved
Name=ToBeRemoved
Event=[EventId]
Timestamp=[BusinessTimestamp]
ExternalId=ToBeRemoved
BusinessTimestamp=[BusinessTimestamp]
Status=[Status]
Type=[AlertType]
Severity=[Severity]
Code=[Code]
Source=Source
Property=[ThingProperty]

FIG. 6

FAULT TOLERANT ADAPTER SYSTEM TO CONSUME DATABASE AS A SERVICE

RELATED APPLICATIONS

The present patent application claims the priority and benefit of an earlier filing date from U.S. Provisional Application No. 62/564,364, filed Sep. 28, 2017, titled "Fault tolerant adapter system to consume database as a service", the contents of which is incorporated herein by reference in its entirety.

BACKGROUND

A large variety of Internet of Things (IoT) data is generated at a high velocity. Databases have different ways of storing and processing IoT data. Database offerings, such as in-memory databases, may come with their own set of artifacts such as calculation views, analytic views, attribute views, etc., for processing and analyzing data. To make data available in a cloud environment, the concept of database as a service (DBaaS) was introduced. A DBaaS user may provision a database, manage, configure and operate with the database using a common set of abstractions (primitives) without having to know the exact implementations of the database. Thus, DBaaS may also provide a good level of developer agility, productivity and data security. Common ways of providing these abstractions include using Representational state transfer (REST) services and/or Open Data Protocol (OData) services.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

FIG. 4 is a block diagram illustrating an exemplary implemented interface of metadata of a database service interface.

FIG. 5 is a block diagram illustrating an exemplary implemented interface of a client application, wherein the exemplary interface is incompatible with the interface of FIG. 4.

FIG. 6 is a block diagram illustrating an exemplary mapping defined between field names of the database service of FIG. 4 and the client application of FIG. 5.

DETAILED DESCRIPTION

Figure 1A:
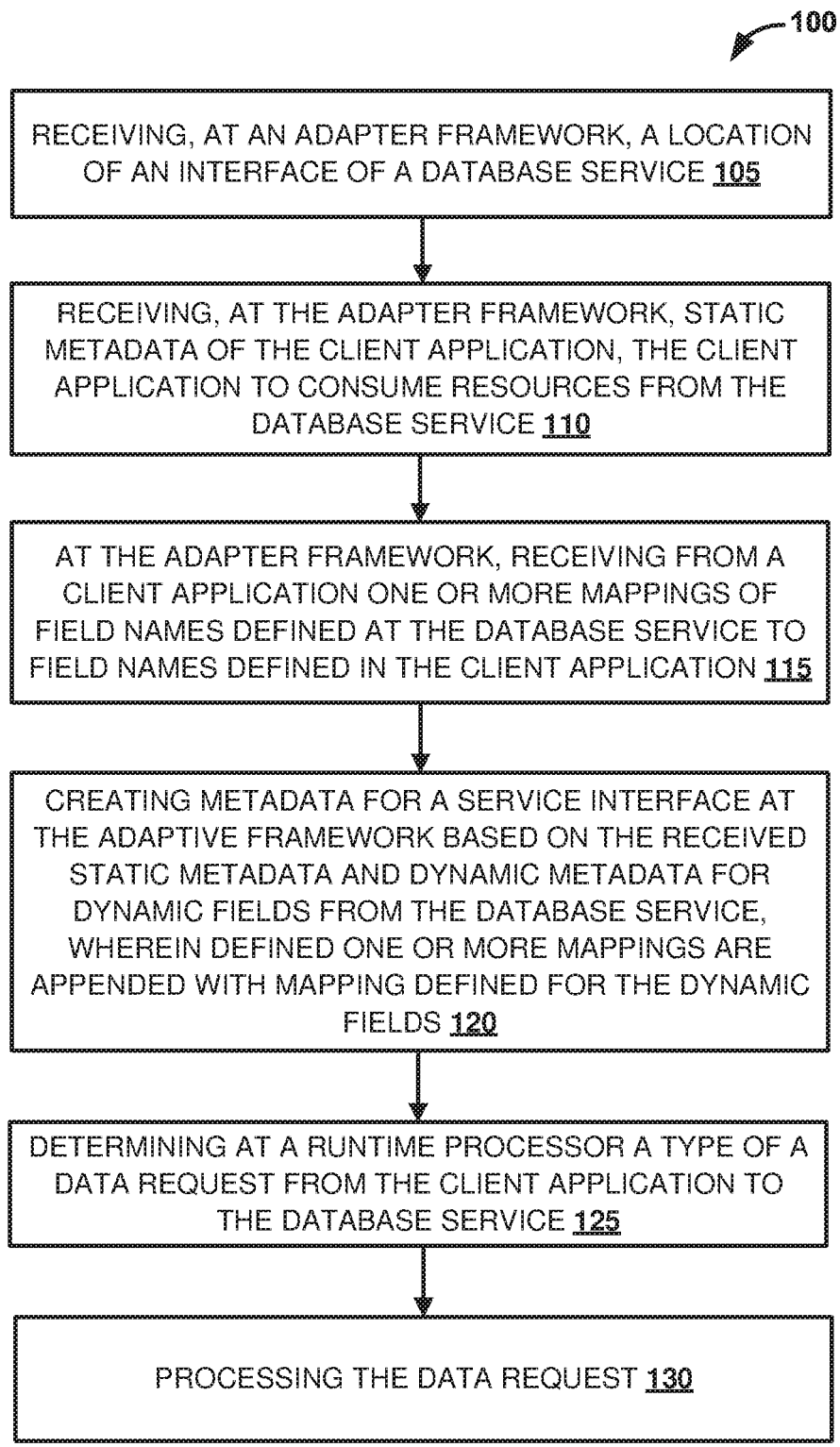
FIG. 1A is a flow diagram illustrating an exemplary process for providing an adapter framework for consuming a database service from applications, according to one embodiment.

Embodiments of techniques for providing a fault tolerant adapter system to consumer database services, are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In one embodiment, applications, such as cloud applications running in a cloud environment, may consume database services. The database services may be such as DBaaS running in the cloud environment and providing resources to be consumed during runtime of the applications through a provided API. Data from a database service may be consumed in an application, e.g. running on cloud. The application may be such as an analysis tool, a machine learning engine, an insight provider, and other applications based on user interface (UI) technologies.

Usually the data being consumed by the applications from a database service is in a different format or a meta model compared to the expected model from the applications. Further, there may different naming conventions. Moreover, these micro applications in complex distributed architectures have dozens of dependencies to these DBaaS services (both single and batch requests) and if one them becomes latent then the entire user request can be blocked. It can also cause resources to become saturated in seconds and can result in cascading failures.

In one embodiment, a reusable adapter framework is provided to protect against failures in application's execution. The adapter framework may provide an isolation technique using a circuit breaker pattern to protect against failures in the entire dependency client execution.

With high volume traffic, a single backend dependency becoming latent can cause all resources to become saturated in seconds on servers. Every point in an application that reaches out over the network or into a client library that might result in network requests is a source of potential failure. These applications can also result in increased latencies between services, which backs up queues, threads, and other system resources causing even more cascading failures across the system.

In one embodiment, Hystrix framework may be used to wrap each underlying dependency. Each dependency is isolated from one another, restricted in the resources it can saturate when latency occurs, and covered in fallback logic that decides what response to make when any type of failure occurs in a dependency.

One of the differences between in-memory calls and remote calls from an application to a database source is that remote calls can become latent unlike in-memory calls. Therefore, remote calls may fail, or hang without a response until some timeout limit is reached. If there are many callers on an unresponsive supplier, then you can run out of critical resources leading to cascading failures across multiple systems. Circuit Breaker pattern may be used to prevent such kind of failure.

Further, the adapter framework may convert the meta model of the consumed DBaaS dependencies into the one expected by the applications and include any dynamic fields that the backend DBaaS provides. It also takes care of mapping the differences in the name of the application and the database server system. The adapter framework may also ensure that the applications using the adapter functionality are tenant aware and also provides fallbacks wherever feasible to protects execution from failures.

The adapter framework may provide a resilient and fault tolerant system for consuming backend DBaaS dependencies, where DBaaS recourses can be consumed at a number of applications and/or services. For example, the applications or services may be mircoapplication or micro services, having a low granularity functionality, which can be easily consolidated into different systems serving different customer needs.

FIG. 1 is a block diagram illustrating an exemplary process 100 for providing an adapter framework for consuming a database service from applications, according to one embodiment.

At 105, a location of an interface of a database service is received at an adapter framework. The database service may be provided as Software-as-a-Service (SaaS), deployed in a cloud environment. The interface may be an Application Programming interface (API), wherein the location of the API may be provided in form of an URL.

At 110, static metadata of the client application is received at an adapter framework. The client application may consume resources from the database service.

At 115, at the adapter framework, receiving from a client application one or more mappings of field names defined at the database service to field names defined in the client application.

At 120, creating metadata for a service interface at the adapter framework based on the received static metadata and dynamic metadata, the dynamic metadata being associated with dynamic fields from the database service. The defined one or more mappings are appended with mappings defined for the dynamic fields.

At 125, determining at a runtime processor a type of a data request from the client application to the database service. The type of request may be such as a read request, a query request, or a batch request. The runtime processor supports batch requests including a number of requests of a given type, where batch request may not be supported by the DBaaS.

At 130, processing the data request. Based on the type of request specific processing is applied. For example, count request may be processed separately from query request. For count request, filter parameters may be determined from the client request. The filter parameters may be mapped to the DBaaS fields using the mapping. The remote calls may be protected using a circuit breaker module. Once the remote calls are restructured to comply with the expectation from the DBaaS, a call to the database may be made and a result may be acquired. The result may be returned as a response back to the client.

A read request contains the key predicate because a read means to fetch a specific (single) record. A query request displays the records or a subset of records based on the condition/parameters like filter, top, skip, etc., in a particular sorted/unsorted order. For count requests, we get the filter parameters from the client request, map it to the DBaaS fields using the mapping, protect the remote call using a circuit breaker and finally make the call and return the response back to the client.

The parameters may be mapped to the DBaaS fields using the mappings. The remote calls to the DBaaS may be protected using a circuit breaker and finally performing the call to the DBaaS. The response is then formatted in an appropriate format as expected by the client application. A separate circuit breaker from within a circuit breaker may be invoked in case of paging requests to the database, in order to make parallel calls and join the response.

At 135, based on the processing, generate a response from the database service to the client application, wherein the response is in a format expected by the application.

Usage in the Adapter Framework with Micro Applications

The adapter system can be used in micro applications created on any technology stack (JAVA, NODE, etc.). The applications have a compile time dependency to the adapter framework.

The following artifacts may be created—metadata, mappings, and a connection file. The metadata in the form of an eXtensible Markup Language (XML) file should to be provided. This is the metadata of the micro application. This is appended with dynamic fields from backend DBaaS. The mappings include one to one field name mapping from backend service to micro application fields should be provided in the form of a property file. The connection property file provides mandatory connection details like DBaaS URL and/or domain, path of URL.

An example of such URL is as follows:
https://<DomainName>/<VersionNumber>/
<EntitySetName><TenantId>/<Query Parameters>

The tenant Id is populated at runtime by the adapters based on the JWT token passed.

Figure 1B:
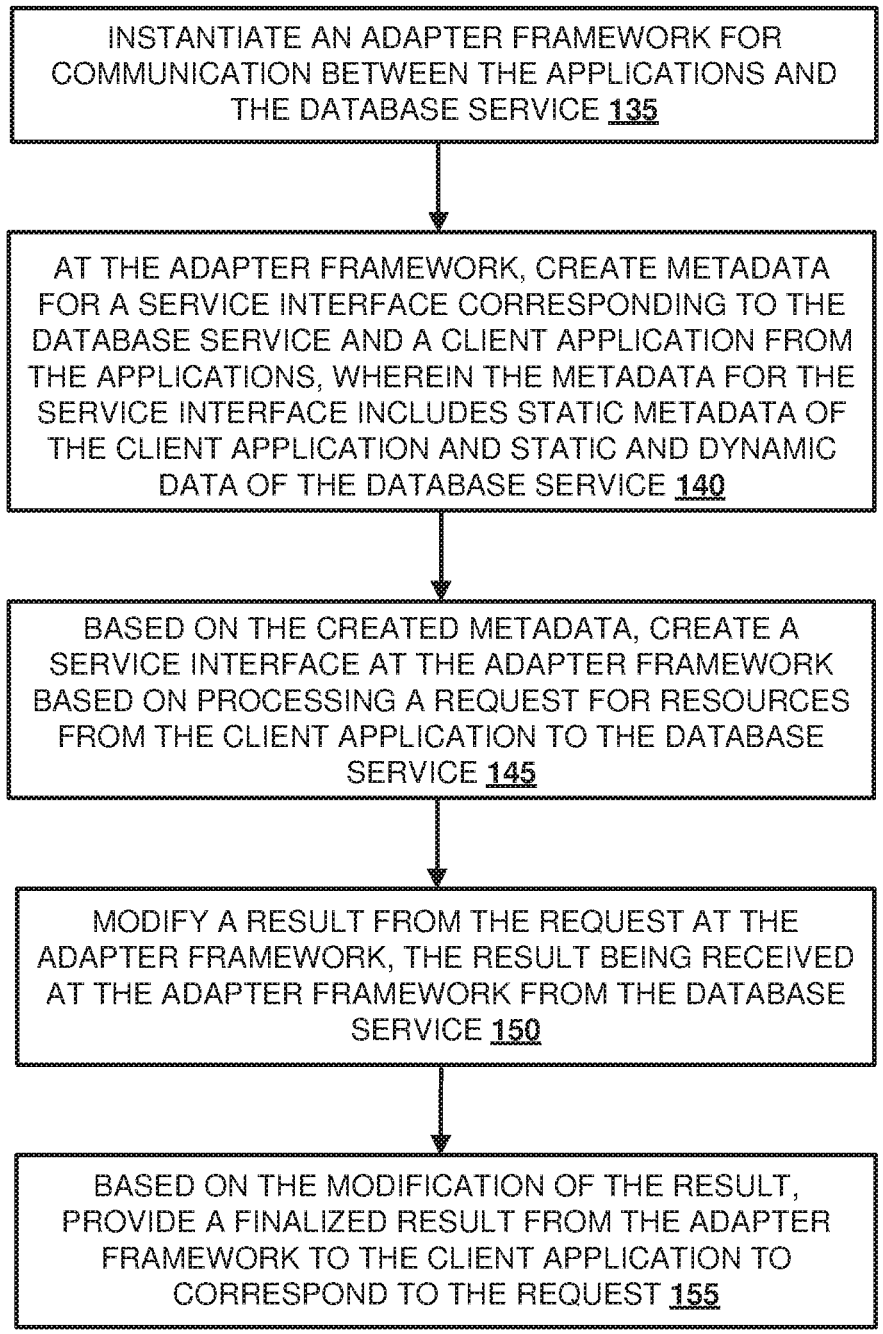
FIG. 1B is a flow diagram illustrating an exemplary process for providing resources to a client application from database service through an adapter framework, according to one embodiment.

FIG. 1B is a block diagram illustrating an exemplary process for providing resources to a client application from database service through an adapter framework, according to one embodiment.

At 135, an adapter framework is instantiated for supporting the communication between applications and database service. The adapter framework may be such as the adapter framework discussed in relation to FIG. 1A. At 140, metadata for a service interface is created at the adapter framework. The metadata for the service interface corresponds to the database service and a client application from the applications. The adapter framework as instantiated may facilitate communication between a number of application requesting resources from one or more database services, which are connected to the framework. The client application and the database service may be implemented as software-as-a-service (SaaS) applications running in a cloud environment. The created metadata for the service interface is defined based on determined static field of the client application, which are provided to the adapter framework from the client application as part of static metadata, and based on determined dynamic fields of the database services. Further the created metadata also includes mappings provided by the client application, which define correspondences between database fields to fields at the client application, and may include additional mappings defined in relation to determined dynamic field at the database service.

Based on the created metadata, the service interface at the adapter framework is created at 145. The service interface is created based on processing a request for resources from the client application to the database service and based on the generated metadata at 140.

At 150, a result from the request for resources from the client application is received at the adapter framework. The result is received at the adapter framework from the database service. The result from the request is modified to be provided to the client application and expected format of a response. The modification of the result includes mapping back the fields of the database service to the fields of the client application, as defined in the created metadata.

At 155, based on the modification of the result, a finalized result from the adapter framework to the client application is provided, where the finalized result corresponds to the request from the client application and is in a format expected by the client application.

Figure 2A:
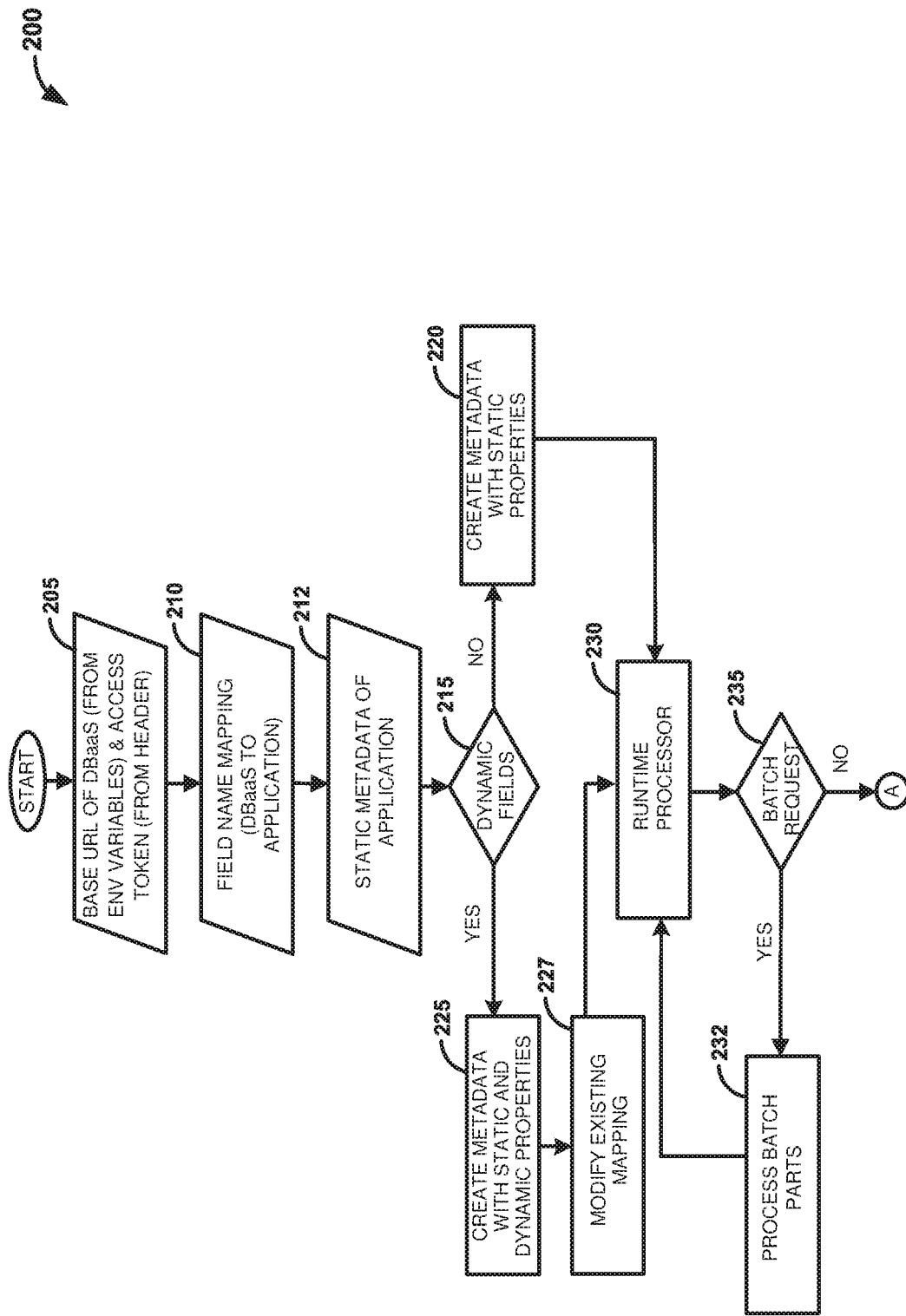
FIGS. 2A and 2B are flow diagrams illustrating a process for providing an adapter framework using circuit breaker pattern to protect against failure in client execution associated with database service consumption, according to one embodiment.
Figure 2B:
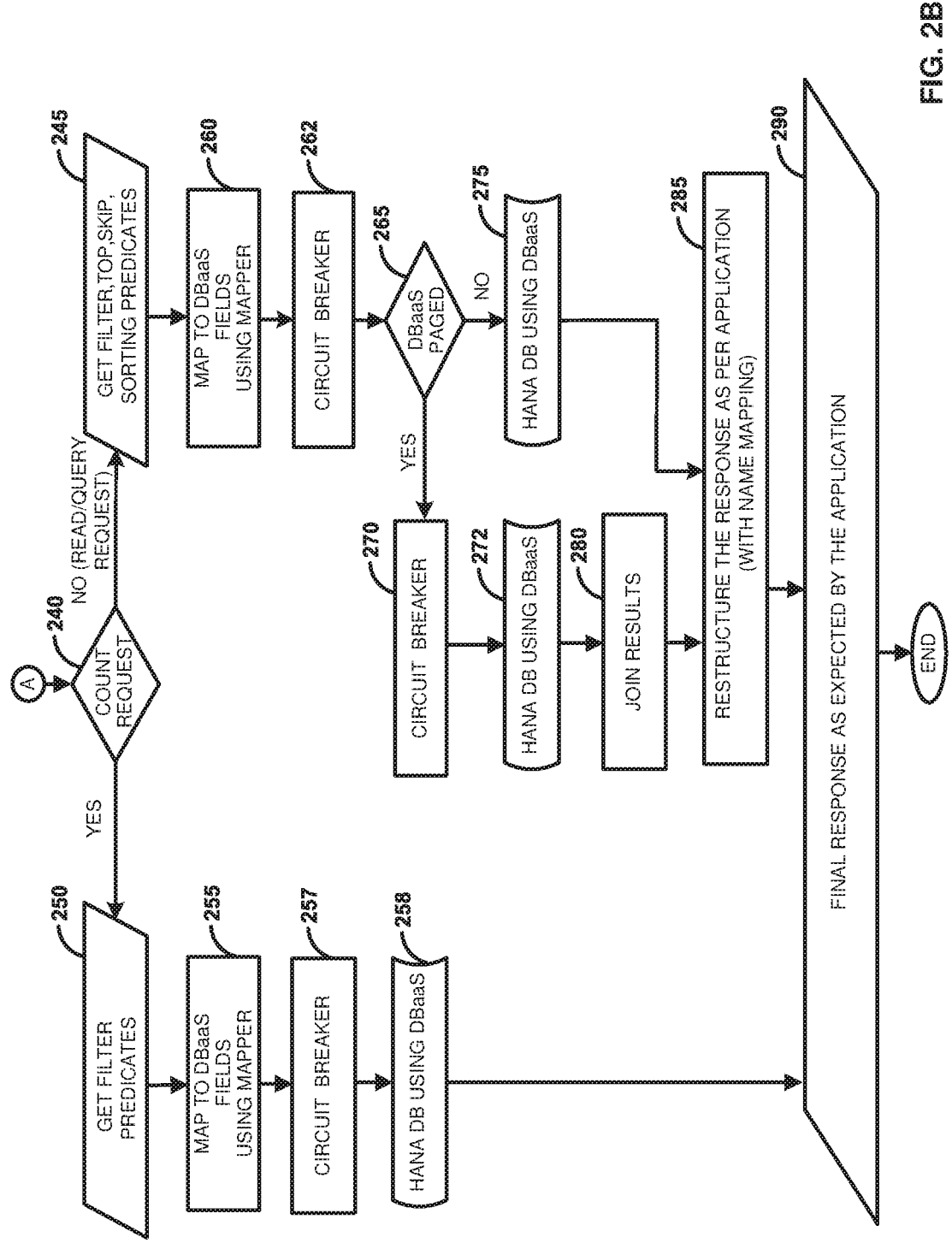

FIGS. 2A and 2B are flow diagrams illustrating a process 200 for providing an adapter framework using circuit breaker pattern to protect against failure in client execution associated with database service consumption, according to one embodiment. At 205, a base Uniform Resource Locator (URL) of a DBaaS is provided to an adapter framework. The adapter framework may serve as an intermediary for communication between application and/or services with the database service. The applications, services and the database service may be provided in form of a software-as-a-service (SaaS) and be deployed and running in a cloud environment. For example, the adapter framework may be such as the discussed adapter framework above in relation to FIG. 1. The URL may be the base URL without any additional path parameters. The URL also has a placeholder for a tenant id, which is populated at runtime based on the identity id being used.

Next, the adapter framework is provided with the mappings and metadata files, as defined at steps 210 and 212. The mappings may be a one to one mapping of the field names in the DBaaS and field names used in the application consuming the database resources provided by the DBaaS. The static metadata received at 212, is metadata of the fields used in the application, which provides the names and type of the fields. This metadata may be compliant to the industry standard Open Data (OData) Protocol, Version 2 (http://www.odata.org/documentation/odata-version-2-0/).

Once the required input is provided (base URL, mappings and metadata) from the application to the adapter framework, then metadata is created for the service that is to be provisioned. At 215, the adapter framework looks for dynamic fields from the DBaaS. Dynamic fields are the fields from a back-end system, which are also replicated on the database. Dynamic fields may have a special naming convention, for example starts with Z. Together with the static fields (provided as input from metadata file) along with these dynamic fields from backend, the final metadata is created. The final metadata include the created metadata with static properties 220 or metadata 225 with static and dynamic properties. The existing mappings are accordingly modified to accommodate the dynamic fields, as identified at 227.

Next, a runtime processor is created at 230. The processor is for the data coming from the DBaaS. The processor checks, at 235, if the request is a batch request or a single request. In case of batch request, the individual batch parts are processed (at 232). Table 1 represents a simple example of a batch operation request body, which may be requested by the application to a DBaaS, where the exemplary batch operation is not supported by an interface provided by an exemplary DBaaS, such as an IoT Application Enablement API of a data source.

TABLE 1

--batch_123
Content-Type: application/http
Content-Transfer-Encoding:binary
GET derivedSignals/$count HTTP/1.1
Host: iot-applications-sharks-1-pdms-odata2-alerts-web.cfapps.sap.hana.ondemand.com
--batch_123
Content-Type: application/http
Content-Transfer-Encoding:binary
GET
derivedSignals?$skip=0&$top=31&$select=Event%2cComponentName%2cStatus%2cAssetExternalId%2cAssetThingId%2cTimestamp%2cThing%2cProperty HTTP/1.1
Host: iot-applications-sharks-1-pdms-odata2-alerts-web.cfapps.sap.hana.ondemand.com
--batch_123--

The individual batch parts are checked to be a count, query or read request.

A count request may be a request to the DBaaS in action, to determine the number of records for a given query request. In case of a count request, at 250, the filter query parameters are taken (from the request send by the application) and mapped (at 255) to the DBaaS field names using the mappings and the final DBaaS query is created. The query may be defined in a URL form. This is then passed through a circuit breaker module 257. The circuit breaker may be configured for response time, number of threads, etc. The final response (as determined at 258) is send back to the application at 290.

In one embodiment, a protected function call may be included in a circuit breaker object, which monitors for failures. Once the failures reach a certain threshold, the circuit breaker may trip, and all further calls to the circuit breaker return with an error, without the protected call being made at all. The circuit breaker avoids making the protected call when the circuit is open, but would need an external intervention to reset it when things are well again. A self-resetting behavior may be implemented by trying the protected call again after a suitable interval, and resetting the breaker should it succeed.

Circuit Breakers will protect against a range of errors that protected call could raise, such as network connection failures. While making remote calls (e.g. DBaaS API calls) there can be timeouts, connection errors, faults, resource failures that can happen. Hence, it is important to protect these calls using circuit breakers Not all errors may trip the circuit, some should reflect normal failures and be dealt with as part of regular logic. With lots of traffic, you can have problems with many calls just waiting for the initial timeout. Since remote calls are often slow, calls may be put separately on different threads. By drawing these threads from a thread pool, you can arrange for the circuit to break when the thread pool is exhausted. Circuit breakers can be used for asynchronous communications as well. On their own, circuit breakers help reduce resources tied up in operations, which are likely to fail. You avoid waiting on timeouts for the client, and a broken circuit avoids putting load on a struggling server. Any change in breaker state may be logged and breakers should reveal details of their state for deeper monitoring.

A read/query request means a request to the DBaaS in action, to give the records for the given query. If it is not a count request, then goes from 240 to 245. In case of read query request, at 245, filter, sorting and top/skip query parameters are taken (from the request send by the application) and mapped to the DBaaS field names using the mappings (at 260). In such manner, a final DBaaS interface is created at the adapter framework. The final interface may be an Application Programming Interface (API) URL, which is then passed through a circuit breaker (262), which is configured for response time, number of threads etc. In case the response of the DBaaS is paged (as determined at 265), another circuit breaker (270) is used to execute the individual page URLs in parallel. The result from querying the database by individual pages at 272 may be joined in a single list at 280. At 285, the final response is mapped back to the fields names of the application (as per the mappings) and send back to the application at 290.

Figure 3A:
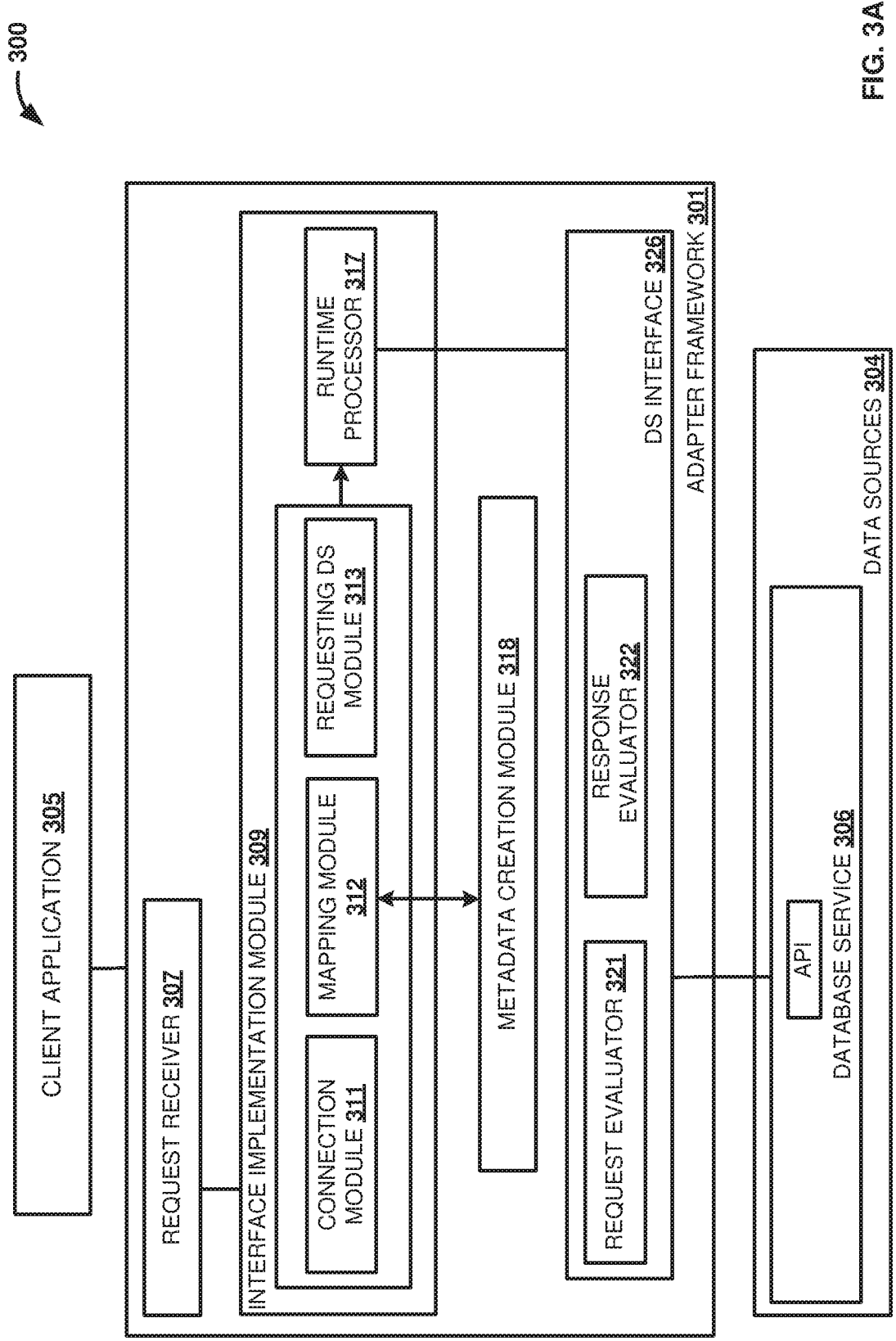
FIG. 3A is a block diagram illustrating a system 300 for consuming a database service from applications, according to one embodiment.

FIG. 3A is a block diagram illustrating a system 300 for consuming a database service from applications, according to one embodiment. The client application 305 is consuming resources provided by a database service 306 provided at data source 304 through an adapter framework 301. The adapter framework may convert the meta model of the backend database service 306 to the meta model expected by the client application 305. These meta models may be incompatible but the adapter framework 301 allows for converting the interface of the database service 306 into an interface expected by the application model of the client application 305. The client application 305 communicates with the adapter framework 301, and sends request for consuming database service resources from the database service 306 through a request received 307 at the adapter framework 301.

In one embodiment, the adapter framework 301 includes an interface implementation module 309 including implementation logic for generation a database (DS) interface 326 associated with the database service 306. The DS interface 326 is generated to map interfaces between the client application 305 and the database service interface. The interfaces may be application programming interfaces (APIs).

The interface implementation module 309 includes a connection module 311, a mapping module 312, a requesting database service (DS) module 313, and a runtime processor 317. The connection module 311 handles storing of an object where a location of the database service 306 may be reached. The set location may be a base URL.

The mapping module 312 is related to creating of a mapping object that is created for getting the field name mappings between the client application 305 and fields defined at the database service 306. The client application 305 may provide the mappings in the form of a property file, which is then parsed to generate the mappings. FIG. 6 presents an exemplary mapping.

The requesting DS module 313 is used for making calls with requests as received from the client application 305 to the database service 306.

The runtime processor 317 is responsible for getting actual data for the database service 306 at the data source 304. The database service may be an OData V2 service providing a restful API for consuming resources. At the runtime processor 317, there are implemented methods for handling requests such as read requests, queries, count requests, and batch requests.

The mapping module 312 is associated with a metadata creation module 318 that creates the metadata for a DS interface 326 that is to be created. The creation of the metadata data includes determining of dynamic fields of the database service, determining of static fields of the client application 305 as provided through static metadata from the client application 305. If dynamic fields are determined at the database service 306, the mappings generated at the mapping module 312 may be modified to include mappings for the dynamic fields.

A database service interface 326 is generated as a result of the processing at the interface implementation module and the executions of the runtime processor 317.

The DS interface 326 includes a request evaluator 312 and a response evaluator 332. The request evaluator 312 receives information about the call from the client application 305 to the database service 306, determines the type of the call and determine how to perform requests for resources to the database service. The DS interface 326 communicate with the database service 306 through the provided API and receives a response back from the database service 306. The response evaluator 322 module is used to structure the response in the way the client application 305 expects. It makes use of parsers for the provided data based on the requests. The result is modified at the DS interface 326 based on mapping operations back to fields of the client application 305 as defined at the metadata stored at the adapter framework 301 in relation to the client application 305 consuming the database service 306. The metadata used for modifying the result includes mappings at mapping module 312 and static and dynamic metadata at metadata creation module 318.

Based on the mappings operations, the response is transformed into the field names expected by the client application as defined at the mappings.

Figure 3B:
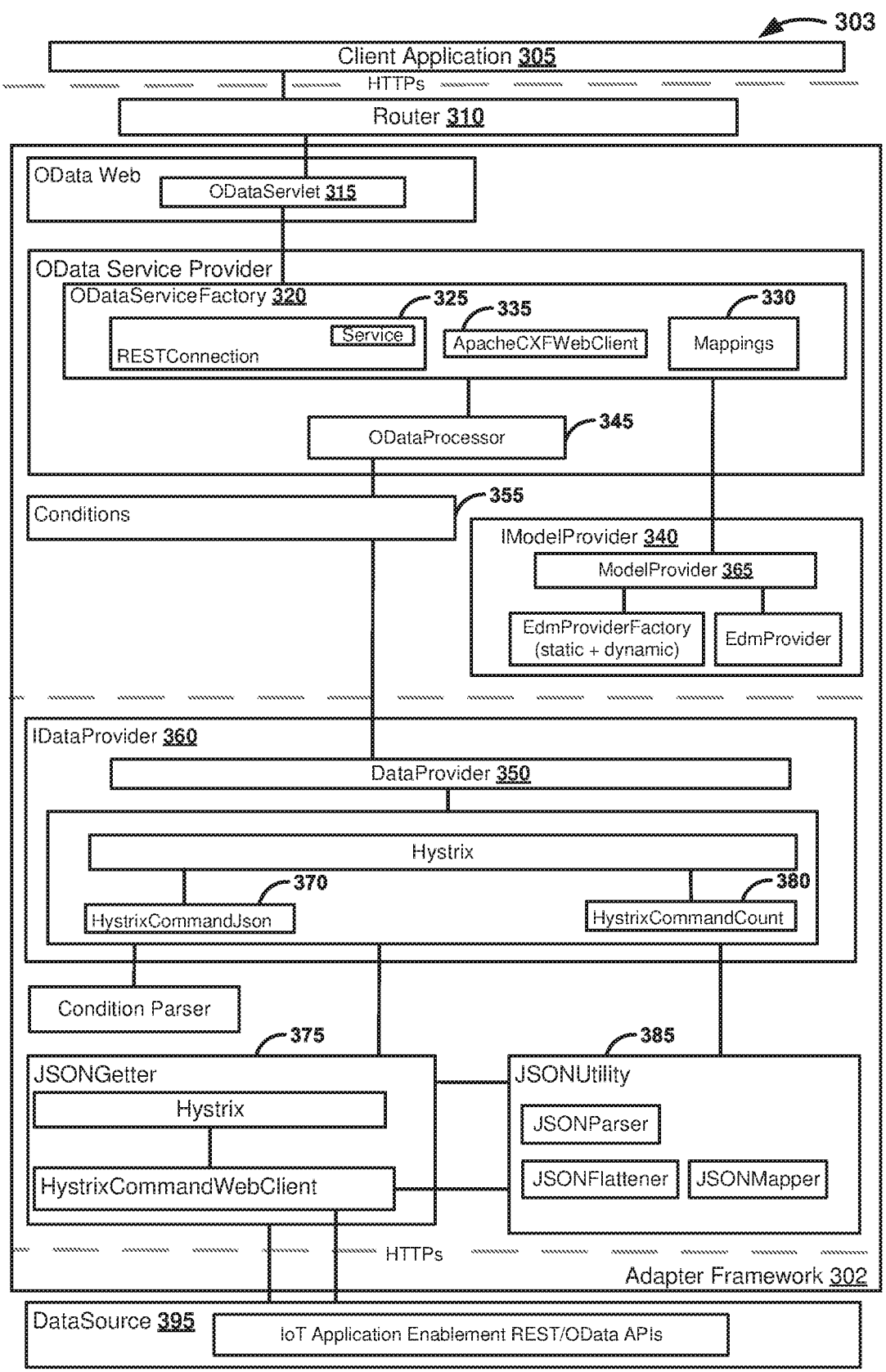
FIG. 3B is a block diagram illustrating a system for providing an adapter framework for consuming a database service from applications, according to one embodiment.

FIG. 3B is a block diagram illustrating a system 303 for providing an adapter framework for consuming a database service from applications, according to one embodiment.

A client application 305 is consuming resources provided by a data source 395 through an adapter framework 302. The client application 305 sends a request, e.g. a single request or a number of requests (a batch request). The client application 305 may be deployed on a cloud platform infrastructure such as a Platform as a Service offering. One or more client applications may be connected to the adapter framework 302 to consume resources provided as a service from the data source 395.

The request gets routed through a router 310 and the relevant security tokens are propagated to the layer.

The communications to the backend DBaaS at data source 395 are made using JSON Web Token (JWT), which are obtained from authorization headers of the client application request.

The request is received at the adapter framework 302 at the ODataServlet 315. The ODataServlet 315 may be a CXFNonSpringJaxrsServlet.

The ODataServlet 315 makes use of the ODataServiceFactory 320 in order to create the OData V2 service.

ODataServiceFactory 320 provides implementation of interface in order to get the following:

1) RESTConnection 325—This is basically an object where the base URL of the DBaaS is set. Also, from the JWT token obtained, the Zone Id of the tenant of the client application is fetched using a JWT decoder, and is set in the base URL. This is done to make the adapter framework 302 multi-tenant aware. Client applications hence can fetch the data from DBaaS running on different cloud tenants.

2) Mapping 330—This is the object that is created for getting the field name mappings between the client application and the DBaaS fields. The applications can provide the mappings in the form of property files, which are parsed to get this object. FIG. 6 presents an exemplary mapping.

3) ApacheCXFWebClient 335—This is the client application, which is used for making calls to the DBaaS.

In order to create the service, the ODataServiceFactory 320 would need a Metadata provider and Runtime processor.

IModelProvider 340 is the block and interface responsible for the metadata of the service.

ModelProvider 365 is an implementation of the IModelProvider 340 interface and creates the metadata for the service. As mentioned in the flowchart described in FIG. 2, if there are dynamic fields from the DBaaS, then the same are included along with the static metadata fields and mappings are accordingly modified. EdmProviderFactory creates the EdmProvider, which is the object responsible for metadata.

ODataProcessor 345 may be the Runtime Processor of FIG. 2, which is responsible for getting the actual data for the database service at the data source 395. The database service may be an OData V2 service, such as the IoT Application Enablement REST/OData APIs. In the ODataProcessor 345, there are various methods for handling various kinds of request like read, query, count and batch.

Also, in the queries such as read, query and count request conditions, including the filter, top, skip, sorting, etc., predicates are fetched.

IDataProvider 360 is the block and interface responsible for the data of the service.

DataProvider 350 is an implementation of the IDataProvider 360 interface and makes use of Hystrix framework. This framework is the one that helps implement the circuit breaker pattern.

Hystrix framework is a library that helps you control the interactions between these distributed services by adding latency tolerance and fault tolerance logic. Hystrix does this by isolating points of access between the services, stopping cascading failures across them, and providing fallback options, all of which improve your system's overall resiliency.

Hystrix is designed to do the following:

Give protection from and control over latency and failure from dependencies accessed (typically over the network) via third-party client libraries.

Stop cascading failures in a complex distributed system.

Fail fast and rapidly recover.

Fallback and gracefully degrade when possible.

Enable near real-time monitoring, alerting, and operational control.

Design Principles used by Hystrix:

Preventing any single dependency from using up all container (such as Tomcat application containers) user threads.

Shedding load and failing fast instead of defining queues.

Performing fallback logic when a request fails, is rejected, times-out, or short-circuits.

Using isolation techniques such as circuit breaker patterns to limit the impact of any one dependency. Tripping a circuit breaker to stop all requests to a particular service for a period of time, either manually or automatically if the error percentage for the service passes a threshold.

Optimizing for time-to-discovery through near real-time metrics, monitoring, and alerting Optimizing for time-to-recovery by means of low latency propagation of configuration changes and support for dynamic property changes in most aspects of Hystrix, which allows you to make real-time operational modifications with low latency feedback loops.

Protecting against failures in the entire dependency client execution, not just in the network traffic.

HystrixCommandJSon 370 is one of the circuit breakers implementations, which gets the actual data from the DBaaS. This is set with circuit breaker properties like thresholds, timeouts etc. and are responsible for making the calls protected. Failure and Fallback handling are also provided.

JSONGetter 375 is called from within the HystrixCommandJSon 370 and checks the DBaaS for pagination. In case the DBaaS is paged, then another circuit breaker implementation Hystrix client (HystrixCommandWebClient) may be used. This basically makes parallel-paged calls and joins the result. If the service is not paged then HystrixCommandWebClient is not used and a DBaaS call is made, for example to the IoT Application Enablement service. The IoT Application Enablement service is a DBaaS providing IoT data collected and stored, for example, in the cloud.

HystrixCommandCount 380 is the other circuit breaker implementation, which gets the number of records from the DBaaS. This is set with circuit breaker properties like thresholds, timeouts etc. and are responsible for making the calls protected. Failure and Fallback handling are also provided.

Once we get back the response for the DBaaS, then a JSONUtility 385 is used to structure it in the way the micro application expects. It makes use of JSONParser. JSONFlattener for this.

Finally, a JSONMapper maps the response into the names expected by the microapplication based on the mappings.

Advantages of Using the Adapter Framework System

The first and the foremost advantage of the adapter framework is that it uses a circuit breaker pattern for making the remote backend calls. A separate circuit breaker is used for separate request types. In the adapter framework, this is achieved my making use of Hystrix technology, which can help protect against a range of failures, e.g. network failure. In case where applications are sending multiple queries, then each of them are put onto a different thread which are drawn from a thread pool. If the pool is exhausted, then the circuit will break. Circuit breakers also help reduce resources tied up in operation, which are likely to fail. Time outs are avoided and a broken circuit prevents load on the server. They also provide mechanisms of failure fallbacks. Hence the use of this pattern isolates the host application from these failures. This pattern also ensures high availability (99.9%) for SaaS.

The system as disclosed at FIG. 3 converts the meta model of the backend service to the one expected by the application. These meta models may be incompatible but the adapter framework allows for converting the interface of one backend model into an interface expected by the application model. Also, the dynamic fields from backend model can also be selectively fetched and combined with the application meta model.

The framework allows the applications to provide field name mappings between the application and backend and the corresponding database. These are used for request mapping to the backend service and response mapping to the application.

The system 300 ensures that the applications are multi-tenant aware. As an example, 2 different applications can use the same framework to connect to backend and data source on different identity zones, having different authorization rights.

The adapter framework supports various system query options that can be send by the applications. Some of them are filtering, sorting (ascending and descending), fetching top records, skipping records, count of records, reading single record based on id, selecting a subset of fields from the response etc. The adapter framework also enables support for operations such as batch operations, which are otherwise not supported by the database as a service API.

The adapter framework encompasses features to enable identity forwarding to backend DBaaS by using tokens or client ids or client secrets.

The adapter framework can be used in various user centric and process centric scenarios within a cloud environment. If the adapter framework is used on the cloud, it has advantages over the on-premise solutions in terms of data security, as the application developers may not be granted database access.

The adapter framework concept can be applied in connection to various Fiori® and SAPUI5® applications. Such applications, based on UI technologies, can use this system to consume the provisioned services in the cloud (e.g. database services) in the format they want. For example, SAPUI5 applications have OData models, which can be configured with OData V2 service created by the system. These applications can send read and query service calls in order to get data based on a filter criteria, ordered by some property in ascending and descending order, data displaying only few properties, count of data, displaying top records and skipping top records, etc. The calls can also be batch calls containing multiple combinations of these read and query calls. Usage of OData models and the adapter system in the Fiori® and SAPUI5® applications may avoid the need to have any analytics logic at the application layer.

The adapter framework described may provide extensibility options for the micro application development, which may include custom implementation for creating metadata, processor, mappings, connections etc. The system can be extended to support higher versions of the provisioned service e.g. OData Protocol V4 (http://docs.oasis-open.org/odata/odata/v4.0/).

FIG. 4 is a block diagram illustrating an exemplary implemented interface of a database service. The exemplary interface defines property names of the database service, such as "EventId", "ExternalId", "ThingId", "ThingName", etc.

FIG. 5 is a block diagram illustrating an exemplary implemented interface of a client application, wherein the exemplary interface is incompatible with the interface of FIG. 4. The exemplary interface of the client application defines property names such as "AssetName". "AssetThingId". "ComponentName", etc.

FIG. 6 is a block diagram illustrating an exemplary mapping defined between field names of the database service of FIG. 4 and the client application of FIG. 5. A mapping between property names as defined in FIG. 5 and names as defined at FIG. 4 are presented on FIG. 6. For example, a property name "ComponentName" from the client application interface (FIG. 5) is mapped to a property name "ThingName" from the database interface (FIG. 4).

Figure 7A:
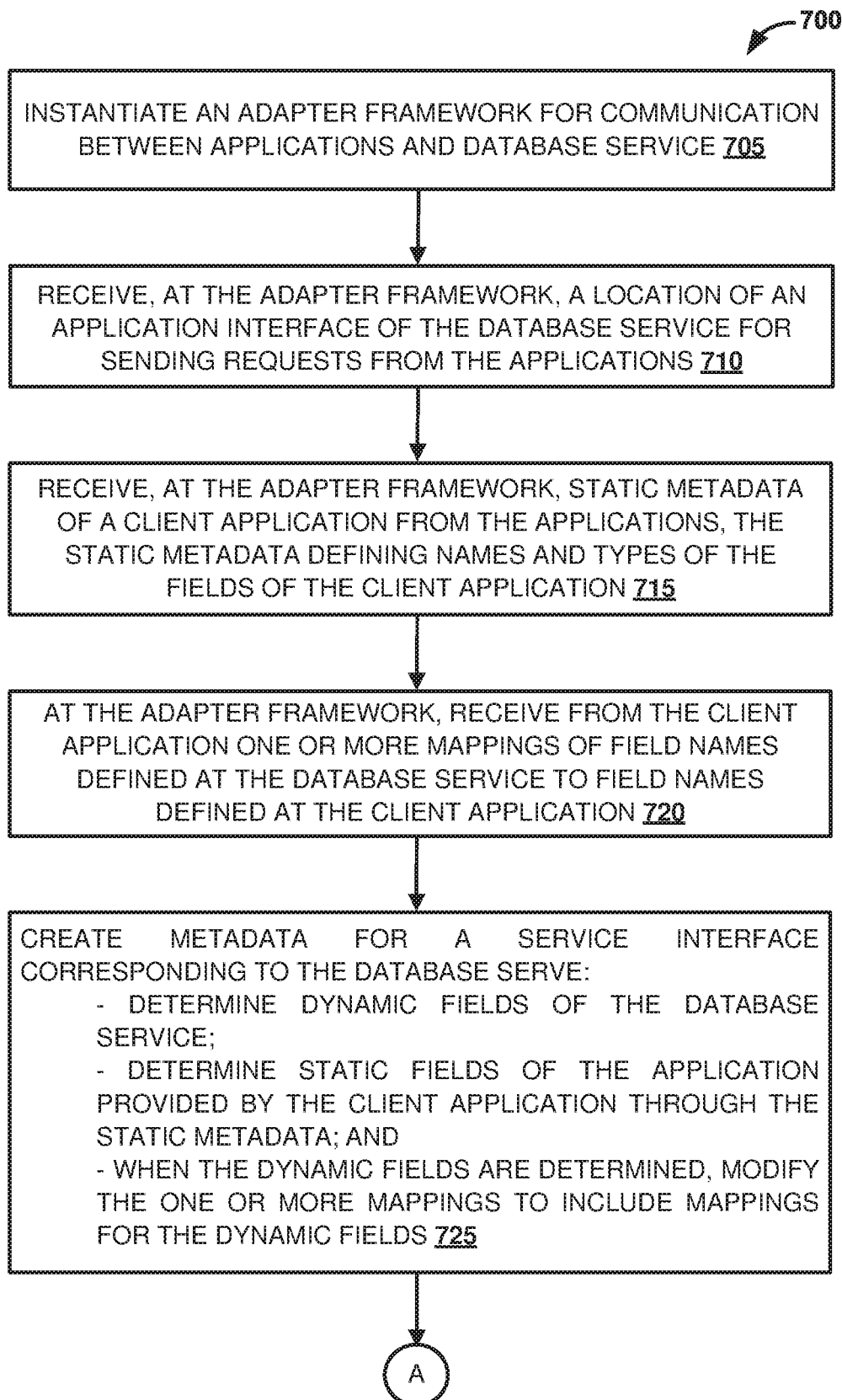
FIGS. 7A and 7B are flow diagrams illustrating an exemplary process of evaluation of data at an adapter framework in relation to serving request between client applications and database services running in a cloud environment, according to one embodiment.
Figure 7B:
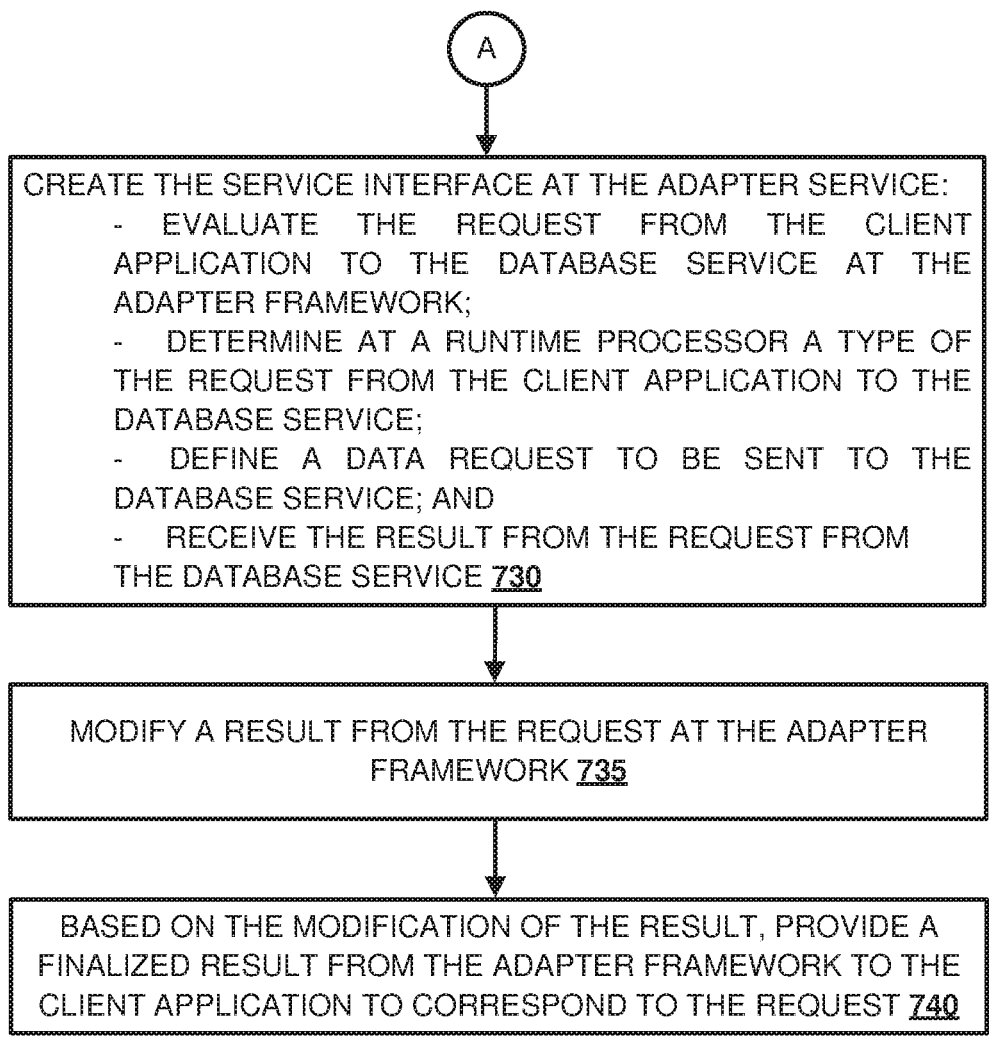

FIGS. 7A and 7B are flow diagrams illustrating an exemplary process 700 of evaluation of data at an adapter framework in relation to serving request between client applications and database services running in a cloud environment, according to one embodiment.

The adapter framework for communication between the applications and the database service is instantiated at 705. The adapter framework may be such as the adapter framework discussed in relation to FIG. 1 to FIG. 6.

At the adapter framework, a location of an application interface of the database service for sending requests is received at 710. The location may be provided in form of a Uniform Resource Locator (URL).

At 715, static metadata of the client application is also received at the adapter framework. The static metadata defines names and types of the fields of the client application.

At 720, the adapter framework receives from the client application one or more mappings of field names defined at the database service to field names defined at the client application.

At 725, metadata for a service interface is created at the adapter framework, the metadata for the service interface corresponding to the database service. The creation of the metadata includes:
    determining dynamic fields of the database service;
    determining static fields of the application provided by the client application through the static metadata; and
    when the dynamic fields are determined, modifying the one or more mappings to include mappings for the dynamic fields 725.

At 730, the service interface is created at the adapter service. The creation includes:
    evaluating the request from the client application to the database service at the adapter framework;
    determining at a runtime processor a type of the request from the client application to the database service;
    defining a data request to be sent to the database service; and
    receiving the result from the request from the database service At 735, a result from the request is received at the adapter framework, the result being received at the adapter framework from the database service. The result is modified based on mapping operations back to fields of the client application as defined at the metadata stored at the adapter framework in relation to the client application consuming the database service.

At 740, based on the modification of the result, a finalized result from the adapter framework to the client application is provided to correspond to the request.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, JavaScript, Node.js, or other object-oriented programming language and development tools. Another embodiment may be implemented in hard-wired circuitry in place of, or in combination with machine readable software instructions.

Figure 8:
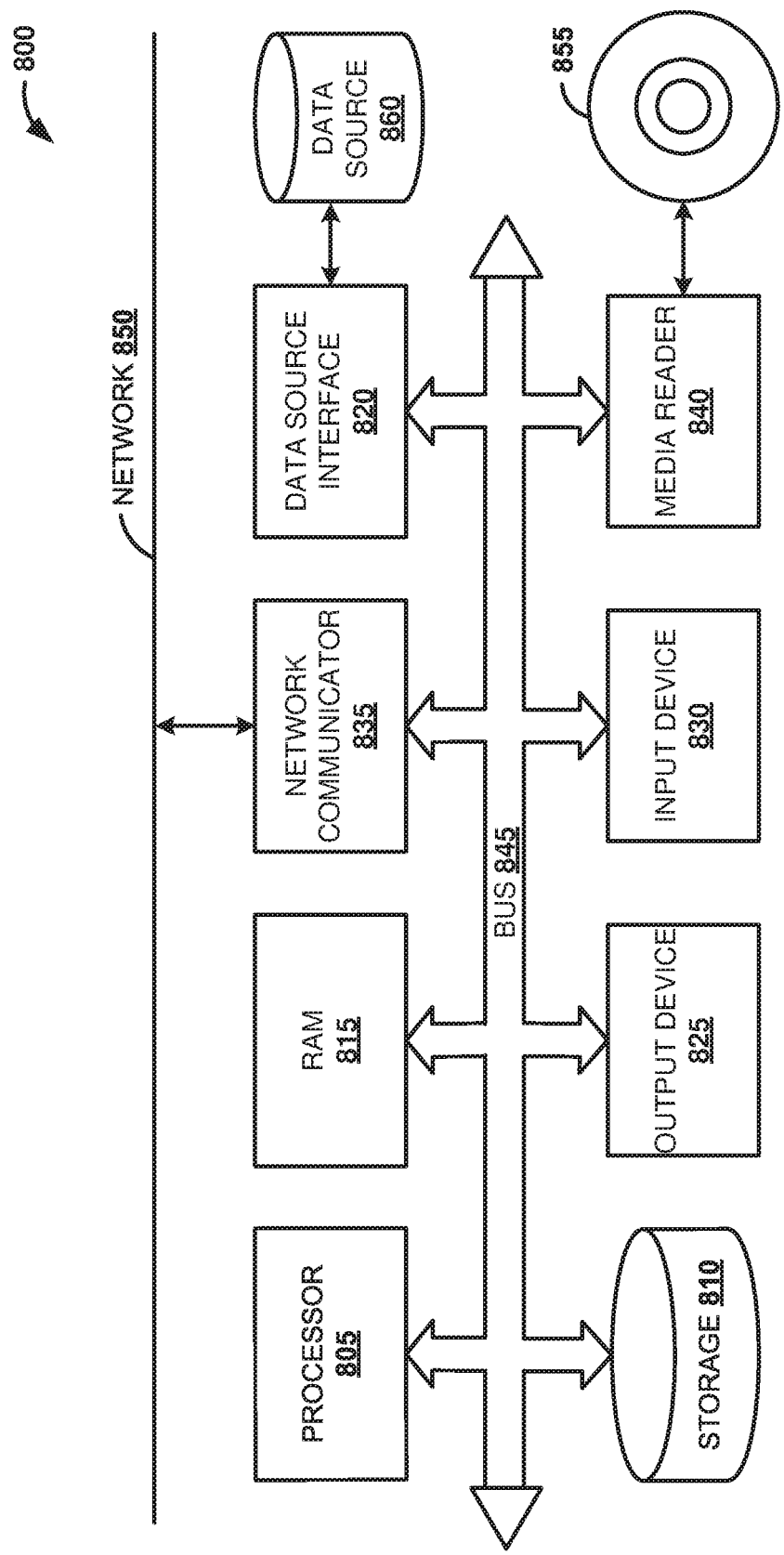
FIG. 8 is a block diagram illustrating an embodiment of a computing environment in which the techniques described for providing an adapter framework for consuming a database service from applications can be implemented.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments, the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for consuming a database service, the method comprising:

instantiating an adapter framework for communication between a client application and the database service, wherein the adapter framework is an intermediary for communication between the client application and services with the database service;

at the adapter framework, creating metadata for a service interface corresponding to the database service and the client application, wherein the metadata for the service interface includes static metadata of the client application and static and dynamic data of the database service, wherein the metadata contains one or more mappings of field names defined at the database service to field names defined in the client application, wherein the one or more mappings comprise one-to-one field name mappings between the field names defined at the database service and the field names defined in the client application;

based on the created metadata including the mappings between the field names defined at the database service and the field names defined in the client application, creating a service interface at the adapter framework based on processing a request for resources from the client application to the database service to provide translation services for communications between the client application and the database service;

in response to receiving the request, modifying a result from the request at the adapter framework based on, at least in part, the mappings of the field names to generate an adapted result, the result being received at the adapter framework from the database service; and providing the adapted result from the adapter framework to the client application to correspond to the request.

2. The computer implemented method of claim 1, further comprising:
receiving, at the adapter framework, a location of an application interface of the database service for sending requests, wherein the location of the application interface is defined in form of a Uniform Resource Locator (URL), wherein the URL includes a placeholder for a tenant identifier (id) associated with the database service, the tenant id being populated at runtime of the database service.

3. The computer implemented method of claim 1, wherein the client application and the database service are provided in form of a software-as-a-service (SaaS) and are deployed and running in a cloud environment.

4. The computer implemented method of claim 1, further comprising:
receiving, at the adapter framework, static metadata of the client application, wherein the static metadata defines names and types of fields of the client application; and
at the adapter framework, receiving from the client application one or more mappings of field names defined at the database service to the field names defined at the client application.

5. The computer implemented method of claim 4, wherein creating the metadata for the service interface at the adapter framework comprises:
determining dynamic fields of the database service;
determining static fields of the client application provided by the client application through the static metadata; and
when the dynamic fields are determined, modifying the one or more mappings to include mappings for the dynamic fields.

6. The computer implemented method of claim 5, wherein modifying the one or more mappings comprises appending mappings defined for the dynamic fields to the one or more mappings received from the client application.

7. The computer implemented method of claim 1, wherein creating the service interface at the adapter framework further comprising:
evaluating the request from the client application to the database service at the adapter framework;
determining at a runtime processor a type of the request from the client application to the database service;
defining a data request to be sent to the database service; and
receiving the result from the request from the database service.

8. The computer implemented method of claim 1, wherein processing the request for resources at the adapter framework includes utilizing a circuit breaker implemented logic at the adapter framework for the communication with the database service to avoid calls during failures of the database service.

9. The computer implemented method of claim 1, wherein modifying the result from the request to the database service at the adapter framework includes:
mapping fields from the result to fields of the client application, wherein the mapping is performed based on the metadata associated with the client application and the database service, and
wherein the finalized result is in a format expected by the client application.

10. A computer system to consume a database service comprising:
a processor;
a memory in association with the processor storing instructions related to:
instantiating an adapter framework for communication between a client application and the database service, wherein the adapter framework is an intermediary for communication between the client application and services with the database service;
at the adapter framework, creating metadata for a service interface corresponding to the database service and the client application, wherein the metadata for the service interface includes static metadata of the client application and static and dynamic data of the database service, wherein the metadata contains one or more mappings of field names defined at the database service to field names defined in the client application, wherein the one or more mappings comprise one-to-one field name mappings between the field names defined at the database service and the field names defined in the client application;
based on the created metadata including the mappings between the field names defined at the database service and the field names defined in the client application, creating a service interface at the adapter framework based on processing a request for resources from the client application to the database service to provide translation services for communications between the client application and the database service;
in response to receiving the request, modifying a result from the request at the adapter framework based on, at least in part, the mappings of the field names to generate an adapted result, the result being received at the adapter framework from the database service; and providing the adapted result from the adapter framework to the client application to correspond to the request.

11. The computer system of claim 10, further comprising:
receiving, at the adapter framework, a location of an application interface of the database service for sending requests;
receiving, at the adapter framework, static metadata of the client application, wherein the static metadata defines names and types of fields of the client application; and
at the adapter framework, receiving from the client application one or more mappings of field names defined at the database service to the field names defined at the client application;
wherein the location of the application interface is defined in form of a Uniform Resource Locator (URL), wherein the URL includes a placeholder for a tenant identifier (id) associated with the database service, the tenant id being populated at runtime of the database service; and
wherein the client application and the database service are provided in form of a software-as-a-service (SaaS) and are deployed and running in a cloud environment.

12. The computer system of claim 10, wherein creating the metadata for the service interface at the adapter framework comprises:
determining dynamic fields of the database service;
determining static fields of the client application provided by the client application through the static metadata; and
when the dynamic fields are determined, modifying the one or more mappings to include mappings for the dynamic fields, wherein modifying the one or more mappings comprises appending mappings defined for the dynamic fields to the one or more mappings received from the client application.

13. The computer system of claim 10, wherein creating the service interface at the adapter framework further comprising:
evaluating the request from the client application to the database service at the adapter framework;
determining at a runtime processor a type of the request from the client application to the database service;
defining a data request to be sent to the database service; and
receiving the result from the request from the database service.

14. The computer system of claim 10, wherein processing the request for resources at the adapter framework includes utilizing a circuit breaker implemented logic at the adapter framework for the communication with the database service to avoid calls during failures of the database service.

15. The computer system of claim 10, wherein modifying the result from the request to the database service at the adapter framework includes:
mapping fields from the result to fields of the client application, wherein the mapping is performed based on the metadata associated with the client application and the database service, and
wherein the finalized result is in a format expected by the client application.

16. A non-transitory computer-readable medium storing instructions which when executed cause a computer system to:
instantiate an adapter framework for communication between a client application and a database service, wherein the adapter framework is an intermediary for communication between the client application and services with the database service;
at the adapter framework, create metadata for a service interface corresponding to the database service and the client application, wherein the metadata for the service interface includes static metadata of the client application and static and dynamic data of the database service, wherein the metadata contains one or more mappings of field names defined at the database service to field names defined in the client application, wherein the one or more mappings comprise one-to-one field name mappings between the field names defined at the database service and the field names defined in the client application;
based on the created metadata including the mappings between the field names defined at the database service and the field names defined in the client application, create a service interface at the adapter framework based on processing a request for resources from the client application to the database service to provide translation services for communications between the client application and the database service;
in response to receiving the request, modify a result from the request at the adapter framework based on, at least in part, the mappings of the field names to generate an adapted result, the result being received at the adapter framework from the database service; and
provide the adapted result from the adapter framework to the client application to correspond to the request.

17. The computer-readable medium of claim 16, further comprising instructions to:
receive, at the adapter framework, a location of an application interface of the database service for sending requests;
receive, at the adapter framework, static metadata of the client application, wherein the static metadata defines names and types of fields of the client application; and
at the adapter framework, receive from the client application one or more mappings of field names defined at the database service to the field names defined at the client application;
wherein the location of the application interface is defined in form of a Uniform Resource Locator (URL), wherein the URL includes a placeholder for a tenant identifier (id) associated with the database service, the tenant id being populated at runtime of the database service; and
wherein the client application and the database service are provided in form of a software-as-a-service (SaaS) and are deployed and running in a cloud environment.

18. The computer-readable medium of claim 16, wherein creating the metadata for the service interface at the adapter framework comprises instructions to:
determine dynamic fields of the database service;
determine static fields of the client application provided by the client application through the static metadata; and
when the dynamic fields are determined, modifying the one or more mappings to include mappings for the dynamic fields, wherein modifying the one or more mappings comprises appending mappings defined for the dynamic fields to the one or more mappings received from the client application.

19. The computer-readable medium of claim 16, wherein creating the service interface at the adapter framework further comprising instructions to:

evaluate the request from the client application to the database service at the adapter framework;
determine at a runtime processor a type of the request from the client application to the database service;
define a data request to be sent to the database service; and
receive the result from the request from the database service.

20. The computer-readable medium of claim 16, wherein modifying the result from the request to the database service at the adapter framework includes:
mapping fields from the result to fields of the client application, wherein the mapping is performed based on the metadata associated with the client application and the database service, and
wherein the finalized result is in a format expected by the client application.

* * * * *